United States Patent
Oosawa

(10) Patent No.: US 10,632,554 B2
(45) Date of Patent: Apr. 28, 2020

(54) WIRE ELECTRICAL DISCHARGE MACHINE, WIRE ELECTRICAL DISCHARGE MACHINING SYSTEM AND JIG

(71) Applicant: FANUC CORPORATION, Yamanashi (JP)

(72) Inventor: Tomohito Oosawa, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 91 days.

(21) Appl. No.: 15/964,663

(22) Filed: Apr. 27, 2018

(65) Prior Publication Data

US 2018/0311752 A1    Nov. 1, 2018

(30) Foreign Application Priority Data

Apr. 28, 2017   (JP) ................. 2017-089633

(51) Int. Cl.
| | |
|---|---|
| *B23H 7/06* | (2006.01) |
| *B23H 7/20* | (2006.01) |
| *B23H 1/02* | (2006.01) |
| *B23H 11/00* | (2006.01) |
| *B23H 7/02* | (2006.01) |

(52) U.S. Cl.
CPC .............. *B23H 7/065* (2013.01); *B23H 1/02* (2013.01); *B23H 7/20* (2013.01); *B23H 11/003* (2013.01); *B23H 7/02* (2013.01); *G05B 2219/45043* (2013.01)

(58) Field of Classification Search
CPC . B23H 7/065; B23H 7/20; B23H 1/02; B23H 11/003; G05B 2219/45043
See application file for complete search history.

(56) References Cited

U.S. PATENT DOCUMENTS

| | | | |
|---|---|---|---|
| 4,996,406 A * | 2/1991 | Nakayama | B23H 7/02 219/69.12 |
| 5,945,009 A | 8/1999 | Beck et al. | |
| 2017/0185065 A1* | 6/2017 | Saito | G05B 19/402 |

FOREIGN PATENT DOCUMENTS

| | | |
|---|---|---|
| CN | 86101714 A | 9/1986 |
| CN | 1118725 A | 3/1996 |
| CN | 102615437 A | 8/2012 |
| CN | 105965113 A | 9/2016 |
| CN | 106475643 A | 3/2017 |
| EP | 0480369 A2 | 4/1992 |
| JP | 6076917 A | 5/1985 |
| JP | 61-008224 A | 1/1986 |

(Continued)

OTHER PUBLICATIONS

English Abstract and Machine Translation for Japanese Publication No. 3198290 U, published Jun. 25, 2015, 16 pgs.

(Continued)

*Primary Examiner* — Geoffrey S Evans
(74) *Attorney, Agent, or Firm* — Fredrikson & Byron, P.A.

(57) ABSTRACT

A wire electrical discharge machine for performing electrical discharge machining on a workpiece by applying voltage across an electrode gap between a wire electrode stretched between an upper nozzle and a lower nozzle and the workpiece to generate electrical discharges, includes a lifting mechanism configured to move the workpiece in the travelling direction of the wire electrode.

9 Claims, 8 Drawing Sheets

(56) References Cited

FOREIGN PATENT DOCUMENTS

| JP | 61-260927 | A |   | 11/1986 |
|---|---|---|---|---|
| JP | 62218025 | A | * | 9/1987 |
| JP | 62264825 | A |   | 11/1987 |
| JP | 62264826 | A |   | 11/1987 |
| JP | 6311226 | A |   | 1/1988 |
| JP | 6416221 | U |   | 1/1989 |
| JP | 01109026 | A | * | 4/1989 |
| JP | 3196919 | A |   | 8/1991 |
| JP | 04146024 | A | * | 5/1992 |
| JP | 04310316 | A | * | 11/1992 |
| JP | 6226541 | A |   | 8/1994 |
| JP | 2586956 | B2 |   | 3/1997 |
| JP | 2000334621 | A |   | 12/2000 |
| JP | 2002001618 | A | * | 1/2002 |
| JP | 3198290 | U |   | 6/2015 |

OTHER PUBLICATIONS

English Abstract and Machine Translation for Japanese Publication No. 03-196919 A, published Aug. 28, 1991, 6 pgs.
English Abstract and Machine Translation for Japanese Publication No. 62-264826 A, published Nov. 17, 1987, 7 pgs.
English Abstract and Machine Translation for Japanese Publication No. 62-264825 A, published Nov. 17, 1987, 6 pgs.
Untranslated Decision to Grant a Patent mailed by Japan Patent Office (JPO) for Application No. 2017-089633, dated May 14, 2019, 3 pgs.
English Machine Translation of Decision to Grant a Patent mailed by Japan Patent Office (JPO) for Application No. 2017-089633, dated May 14, 2019, 2 pgs.
Untranslated Notice of Reasons for Refusal mailed by Japan Patent Office (JPO) for Application No. 2017-089633, dated Jan. 15, 2019, 9 pgs.
English Machine Translation of Notice of Reasons for Refusal mailed by Japan Patent Office (JPO) for Application No. 2017-089633, dated Jan. 15. 2019, 9 pgs.
English Abstract and Machine Translation for Japanese Publication No. 60-076917 A, published May 1, 1985, 6 pgs.
English Abstract and Machine Translation for Japanese Publication No. 2000-334621 A, published Dec. 5, 2000, 11 pgs.
English Machine Translation for Japanese Publication No. JPS6416221 U, published Jan. 26, 1989, 3 pgs.
English Abstract and Machine Translation for Japanese Publication No. 06-226541 A, published Aug. 16, 1994, 8 pgs.
English Abstract and Machine Translation for Japanese Publication No. 63-011226 A, published Jan. 18, 1988, 6 pgs.
English Abstract and Machine Translation for Japanese Publication No. 61-008224 A, published Jan. 14, 1986, 14 pages.
English Abstract and Machine Translation for Japanese Publication No. 61-260927 A, published Nov. 19, 1986, 5 pages.
Extended European Search Report dated Sep. 20, 2018 for related European Patent Application No. 18169482.9, 8 pages.
English Abstract and Machine Translation for Chinese Publication No. 106475643 A, published Mar. 8, 2017, 12 pgs.
English Abstract and Machine Translation for Chinese Publication No. 1118725 A, published Mar. 20, 1996, 23 pgs.
English Abstract and Machine Translation for Chinese Publication No. 102615437 A, published Aug. 1, 2012, 26 pgs.
English Abstract and Machine Translation for Chinese Publication No. 105965113 A, published Sep. 28, 2016, 15 pgs.
English Machine Translation for Japanese Publication No. 2586956 B2, published Mar. 5, 1997, 3 pgs.
English Abstract and Machine Translation for Chinese Publication No. 86101714 A, published Sep. 10, 1986, 13 pgs.

* cited by examiner

WIRE ELECTRICAL DISCHARGE MACHINE, WIRE ELECTRICAL DISCHARGE MACHINING SYSTEM AND JIG

CROSS-REFERENCE TO RELATED APPLICATION

This application is based upon and claims the benefit of priority from Japanese Patent Application No. 2017-089633 filed on Apr. 28, 2017, the contents of which are incorporated herein by reference.

BACKGROUND OF THE INVENTION

Field of the Invention

The present invention relates to a wire electrical discharge machine and a wire electrical discharge machining system for use in performing electrical discharge machining on a workpiece set on a work table as well as relating to a jig for fixing the workpiece on the work table.

Description of the Related Art

Japanese Laid-Open Patent Publication No. 03-196919 discloses a core removal method comprising the steps of suctioning, by means of a suctioning face of a core retainer, a core that has been trapped in a lower arm moving a table with the core being suctioned so as to convey the core to a position away from the top of the lower arm, and dropping the core by stopping suction.

SUMMARY OF THE INVENTION

If a small core is formed, the core may fall into a lower nozzle. In such a case, the technique disclosed in Japanese Laid-Open Patent Publication No. 03-196919 is not available to suck the core, and it is necessary to remove the core from the lower nozzle. Since the workpiece is located close to the lower nozzle, the workpiece needs to be detached from the work table in order to remove the core. Once the workpiece has been detached and is attached again, it is difficult to set the workpiece at the same position without error. Thus, there is a risk that the machining accuracy is deteriorated.

The present invention has been devised to solve the above problem, it is therefore an object of the present invention to provide a wire electrical discharge machine, a wire electrical discharge machining system and a jig which enable a core to be removed without detaching the workpiece from the work table.

According to the aspect of the present invention, a wire electrical discharge machine for performing electrical discharge machining on a workpiece by applying voltage across an electrode gap between a wire electrode stretched between an upper nozzle and a lower nozzle and the workpiece to generate electrical discharges, comprising a lifting mechanism configured to move the workpiece in the travelling direction of the wire electrode.

According to the present invention, it is possible to remove the core without detaching the workpiece from the work table, hence suppress deterioration in the machining accuracy of the workpiece.

The above and other objects features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

The present invention will be described referring to embodiments of the invention. The following embodiments should not limit the invention according to the claims. Not all combinations of features described in the embodiments are necessarily essential to the solving means of the invention.

[First Embodiment]

[Configuration of Wire Electrical Discharge Machine]

Figure 1:
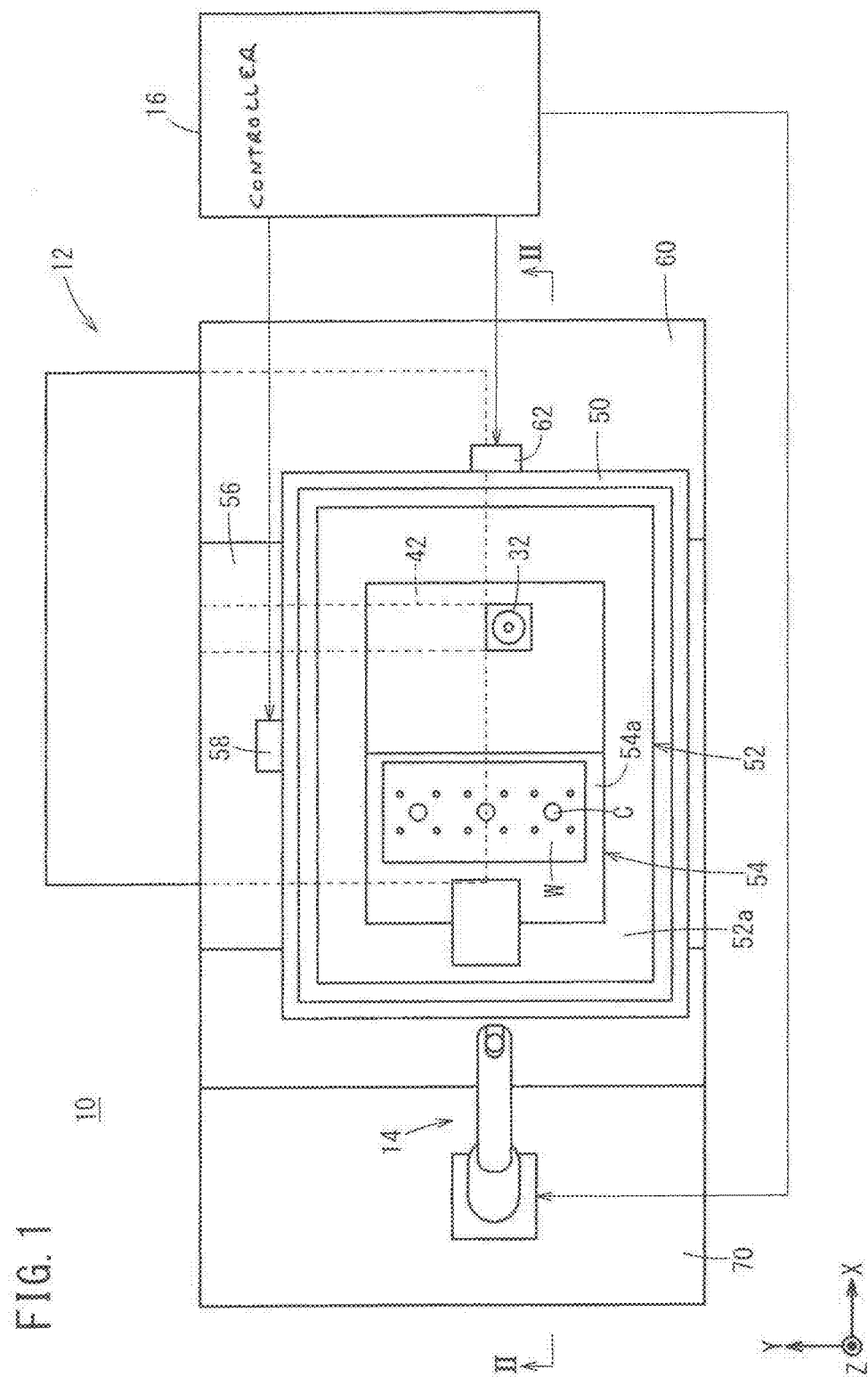
FIG. 1 is a schematic diagram showing a configuration of a wire electrical discharge machining system.
Figure 2:
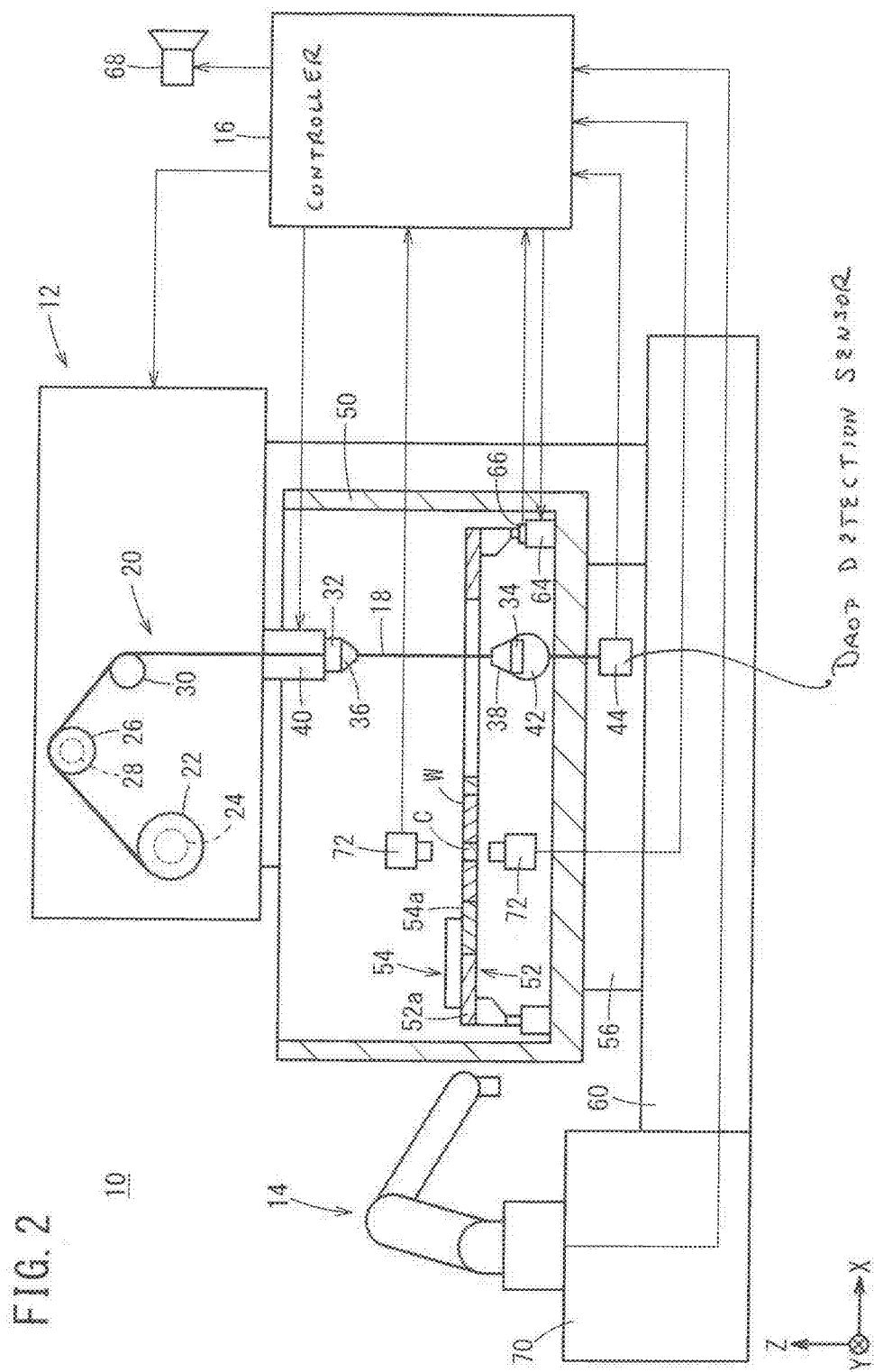
FIG. 2 is a schematic diagram showing a configuration of a wire electrical discharge machining system.

FIGS. 1 and 2 are schematic views showing a configuration of a wire electrical discharge machining system 10 according to this embodiment. FIG. 1 is a view of the wire electrical discharge machining system 10 as seen from the top (positive Z-axis direction), and FIG. 2 is a partial sectional view taken along line II-II of FIG. 1. Hereinafter, the axis extending in the horizontal direction in FIG. 1 is defined as the X-axis, the axis orthogonal to the X-axis on the horizontal plane is defined as the Y-axis, the axis perpendicular to the X-axis and the Y-axis is defined as the Z-axis. In FIG. 1, the rightward is the positive X-axis direction, the upward is the positive Y-axis direction, and the upward in FIG. 2 is the positive Z-axis direction.

The wire electrical discharge machining system 10 includes a wire electrical discharge machine 12, an articulated robot 14 and a controller 16.

The wire electrical discharge machine 12 is a machine tool that performs electrical discharge machining on a workpiece W by applying voltage to an electrode gap formed between a wire electrode 18 and the workpiece W to generate electrical discharge. The wire electrode 18 is formed of, for example, tungsten-based, copper alloy-based, brass-based metal or the like. On the other hand, the material of the workpiece W is, for example, a metal material such as an iron-based material or a carbide material.

The wire electrical discharge machining system 10 includes a wire electrical discharge machine 12, an articulated robot 14 and a controller 16. The wire electrical discharge machine 12 includes a feed mechanism 20 for feeding the wire electrode 18. The feed mechanism 20 includes a wire bobbin 22 on which the wire electrode 18 is wound, a torque motor 24 for applying torque to the wire bobbin 22, a brake roller 26 for applying a braking force of friction on the wire electrode 18, a brake motor 28 for applying brake torque on the brake roller 26, a guide roller 30 for guiding the wire electrode 18, an upper wire guide 32 for guiding the wire electrode 18 above the workpiece W, a lower wire guide 34 for guiding the wire electrode 18 below the workpiece W and an unillustrated collecting mechanism for collecting the wire electrode 18. With this configuration, the wire electrode 18 can travel in the negative Z-axis direction between the upper wire guide 32 and the lower wire guide 34. The upper wire guide 32 and the lower wire guide 34 respectively have an upper nozzle 36 and a lower nozzle 38 for jetting a (dielectric) working fluid.

The upper wire guide 32 and the upper nozzle 36 are supported by a Z-axis driving mechanism 40. The Z-axis driving mechanism 40 has an unillustrated Z-axis motor and can move the upper wire guide 32 and the upper nozzle 36 in the Z-axis direction. The lower wire guide 34 and the lower nozzle 38 are supported by an arm 42 extended from the collecting mechanism. The lower nozzle 38 has a drop detection sensor 44 for detecting that the core C formed in machining the workpiece W has fallen into the lower nozzle 38. When the core C falls into the lower nozzle 38 and comes into contact with the wire electrode 18, a current flows from the wire electrode 18 to the core C side, so that the current value between the wire electrode 18 and the workpiece W becomes smaller than usual. When the wire electrode 18 is being fed, the core C fallen inside the lower nozzle 38 repeats contacting to and separating from the wire electrode 18, so that the current value between the wire electrode 18 and the workpiece W fluctuates. The drop detection sensor 44 monitors the decrease or fluctuation of the current value to detect that the core has fallen in the lower nozzle 38.

The wire electrical discharge machine 12 includes a work-pan 50 capable of storing the working fluid such as deionized water or oil used for electrical discharge machining of the workpiece W. A work table 52 on which the workpiece W is set is installed in the work-pan 50. The workpiece W is held by a retainer 54a of a jig 54 so as not to be movable relative to the jig 54 and is fixed to the work table 52 by fixing the jig 54 to a top plate 52a of the work table 52. The work-pan 50 is installed movably on a saddle 56 in the Y-axis direction. The work-pan 50 is joined integrally with an unillustrated nut on a ball screw so as to be able to move in the Y-axis direction as the screw shaft of the ball screw is driven to turn by a Y-axis motor 58.

The saddle 56 is arranged on a bed 60, movably in the X-axis direction. The saddle 56 is joined integrally with a ball screw nut (not shown) so as to be able to move in the X-axis direction as the screw shaft of the ball screw is driven to turn by an X-axis motor 62. The work table 52 installed in the work-pan 50 moves together with the work-pan 50. As a result, the workpiece W placed on the work table 52 can move in the X-axis direction and the Y-axis direction with respect to the wire electrode 18.

The work table 52 has a lifting mechanism 64 for moving the top plate 52a of the work table 52 in the Z-axis direction. The lifting mechanism 64 has an unillustrated lift motor or the like so as to move the top plate 52a of the work table 52 in the Z-axis direction by driving the lift motor. At this time, the workpiece W placed on the work table 52 also moves in the Z-axis direction together with the top plate 52a. The lifting mechanism 64 has a linear scale 66 for detecting a stroke of the top plate 52a of the work table 52.

The articulated robot 14 is installed on a mount base 70 arranged adjacent to the bed 60. The articulated robot 14 changes workpieces W, collects the core C dropped in the lower nozzle 38 during machining the workpiece W and so on. Further, the articulated robot 14 has a distance measuring sensor 72 attached as an end effector, moves the distance measuring sensor 72 above and below the workpiece W before machining to measure the distance to the workpiece W. The plate thickness of the workpiece W can be calculated from the thus measured distance between the distance measuring sensor 72 and the workpiece W.

Figure 3:
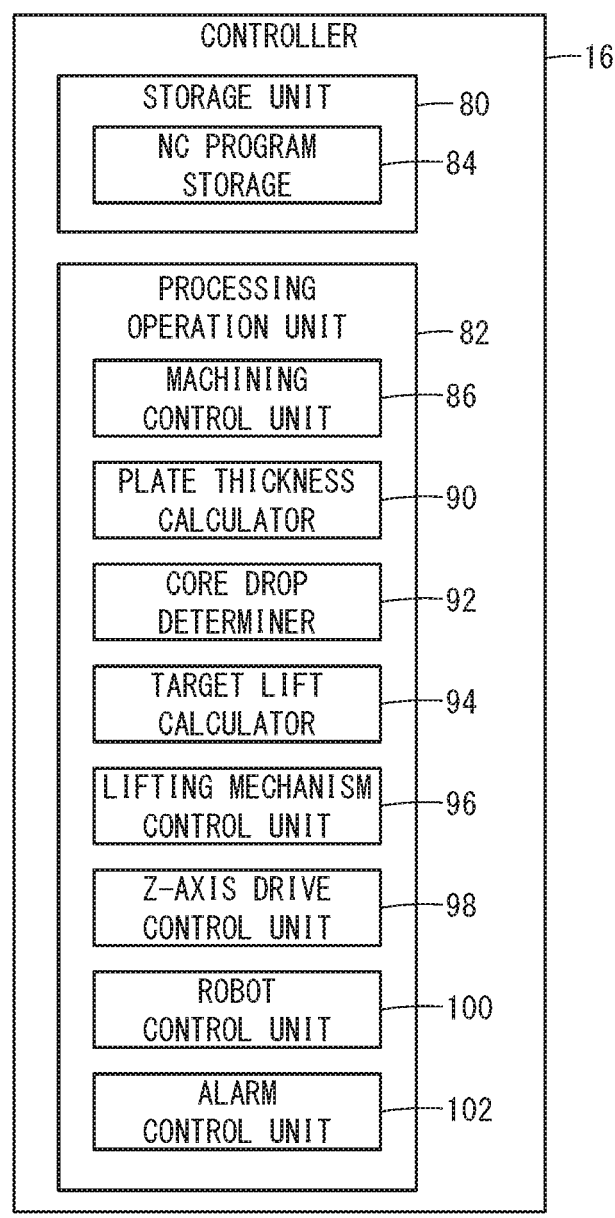
FIG. 3 is a block diagram showing a configuration of a controller.

The controller 16 receives various pieces of information from the drop detection sensor 44, the linear scale 66 and the distance measuring sensor 72, and outputs command signals to control the articulated robot 14, the torque motor 24, the brake motor 28, the X-axis motor 62, the Y-axis motor 58, the Z-axis motor of the Z-axis driving mechanism 40 and the lifting mechanism 64. [Configuration of Control Device] FIG. 3 is a block diagram showing a configuration of the controller 16. The controller 16 includes a storage unit 80 and a processing operation unit 82. The storage unit 80 has a numerical control (NC) program storage 84. The NC program storage 84 stores an NC program that specifies a machining shape of the workpiece W and the like.

The processing operation unit 82 includes a machining control unit 86, a plate thickness calculator 90, a core drop determiner 92, a target lift calculator 94, a lifting mechanism control unit 96, a Z-axis drive (mechanism) control unit 98, a robot control unit 100 and an alarm control unit 102.

The machining control unit 86 controls the feed mechanism 20 (the torque motor 24, the brake motor 28), the X-axis motor 62, the Y-axis motor 58 and the Z-axis motor of the Z-axis driving mechanism 40, so that the workpiece W is machined into a shape according to the NC program.

The plate thickness calculator 90 calculates the thickness of the workpiece W using the distance between the distance measuring sensor 72 and the workpiece W. The core drop determiner 92, based on the information input from the drop detection sensor 44, determines whether or not the core C has dropped in the lower nozzle 38. The target lift calculator 94 calculates a target lift value of the workpiece W to be lifted by the lifting mechanism 64 using the calculated thickness of the workpiece W. The lifting mechanism control unit 96, in accordance with the target lift calculated by the target lift calculator 94, outputs command signals to the lifting mechanism 64 and performs position control of the workpiece W with respect to the Z-axis direction.

The Z-axis drive control unit 98 outputs command signals to the Z-axis motor of the Z-axis driving mechanism 40 and performs position control of the upper wire guide 32 and the upper nozzle 36 with respect to the Z-axis direction. The robot control unit 100 outputs command signals to the articulated robot 14 to perform exchange control of workpieces W and collection control of the core C. The alarm control unit 102 outputs a command signal to the alarm unit 68 and notifies the operator via voice or screen display.

[Regarding Core Collection Control Process]

In the wire electrical discharge machine 12 of the present embodiment, the core C is fixed to the workpiece W so that the core C will not drop into the work-pan 50. However, due to fixing failure of the core C to the workpiece W, the core C may fall from the workpiece W in some cases. In such a case, although a core C fallen in the work-pan 50 does not cause any problem, a small core C sometimes drops into the lower nozzle 38. In this case, in the present embodiment, the core C is collected by the articulated robot 14. However, since the workpiece W is set on the work table 52 and positioned near the lower nozzle 38, the workpiece W gives hindrance to collection of the core C by the articulated robot 14.

Figure 4A:
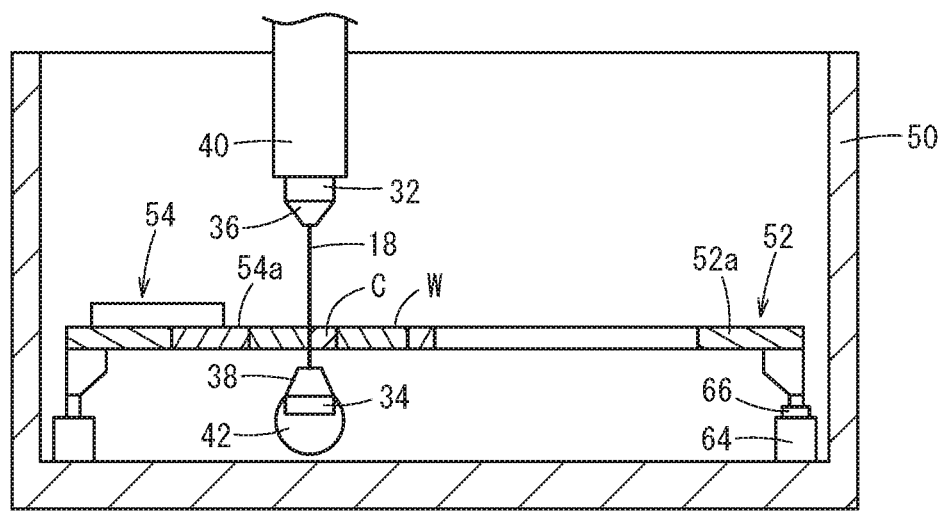
FIG. 4A is a schematic sectional view of an interior of a work-pan, showing a state in which a workpiece is being machined.
Figure 4B:
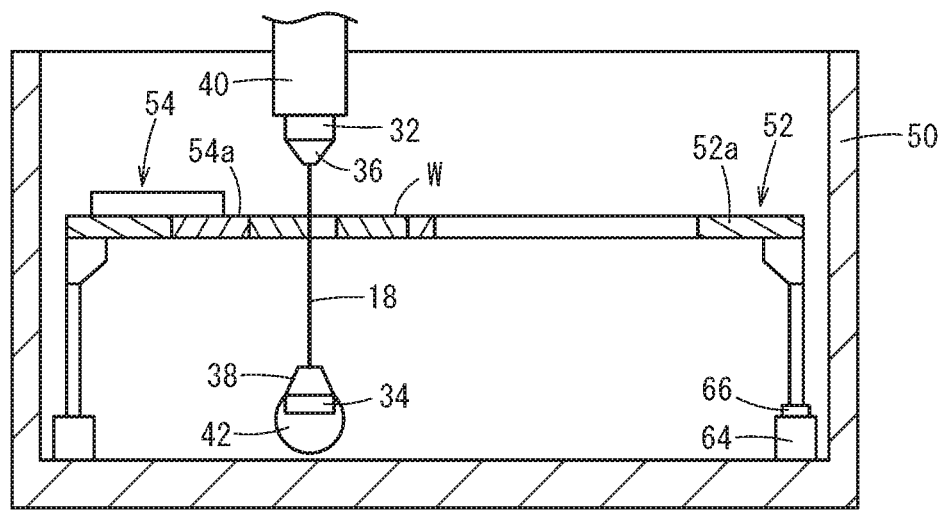
FIG. 4B is a schematic sectional view of the interior of the work-pan, showing a state in which the workpiece has been moved in the Z-axis direction by a lifting mechanism.

FIGS. 4A and 4B are schematic sectional views showing the interior of the work-pan 50. FIG. 4A is a diagram showing a state where the workpiece W is being machined. FIG. 4B is a diagram showing a state where the workpiece W has been moved in the Z-axis direction by the lifting mechanism 64. When the workpiece W is machined, the lifting mechanism 64 of the present embodiment sets the workpiece W by bringing its undersurface a predetermined distance close to the lower nozzle 38, as shown in FIG. 4A. On the other hand, when collecting the core C dropped in the lower nozzle 38, the workpiece W is moved in the positive Z-axis direction as shown in FIG. 4B. Then, the core C can be collected by the articulated robot 14.

Figure 5A:
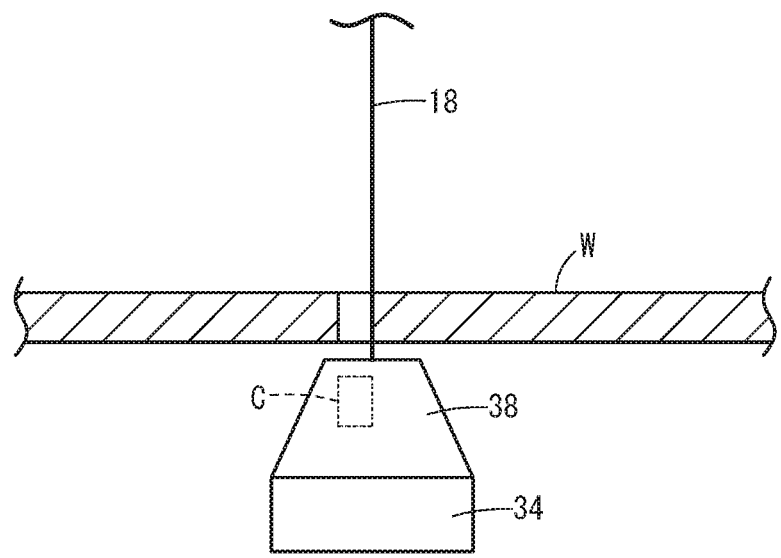
FIG. 5A is a schematic diagram showing a state in which a core of a workpiece W having a relatively small plate thickness falls into a lower nozzle.
Figure 5B:
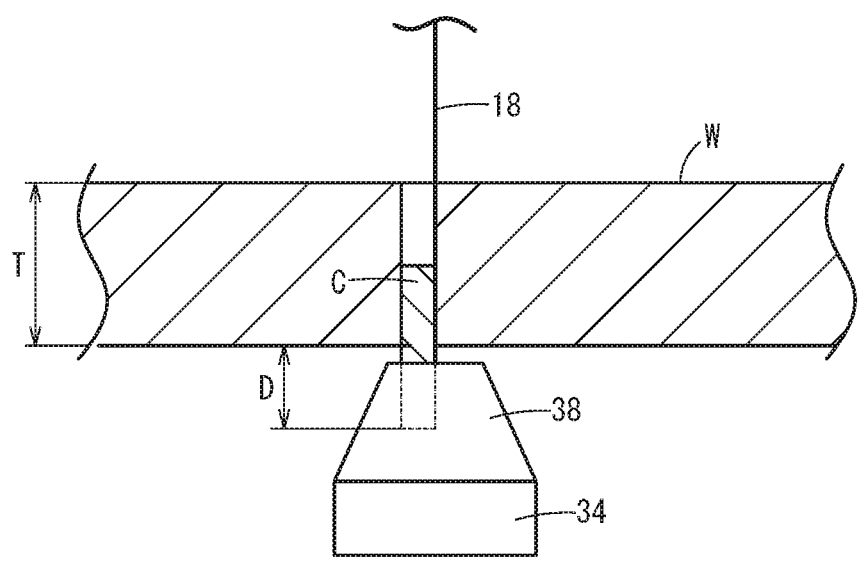
FIG. 5B is a schematic view showing a state in which a core of the workpiece W having a relatively large plate thickness falls into the lower nozzle.

FIG. 5A is a schematic diagram showing a state in which a core C of a relatively thin workpiece W has fallen in the lower nozzle 38. FIG. 5B is a schematic view showing a state in which a core C of a relatively thick workpiece W has fallen in the lower nozzle 38. As shown in FIG. 5A, when the workpiece W is relatively thin, the dropped core C enters into the lower nozzle 38 as a whole.

On the other hand, as shown in FIG. 5B, when the workpiece W is relatively thick, part of the dropped core C remains in the hole of the workpiece W, straddling the space between the workpiece W and the lower nozzle 38 because the workpiece W is positioned with the undersurface brought close to the lower nozzle 38. In order to pick up the core C by the articulated robot 14, it is necessary to move the workpiece W in the positive Z-axis direction up to a position where the core C completely comes out of the hole of the workpiece W. Since the distance D between the undersurface of the workpiece W and the position where the core C abuts against the lower nozzle 38 has been known beforehand, if the thickness T of the workpiece W is known, it is possible for the core C to completely go through the hole of the workpiece W by moving the workpiece W by, at least, the distance (T-D) in the positive Z-axis direction.

Figure 6:
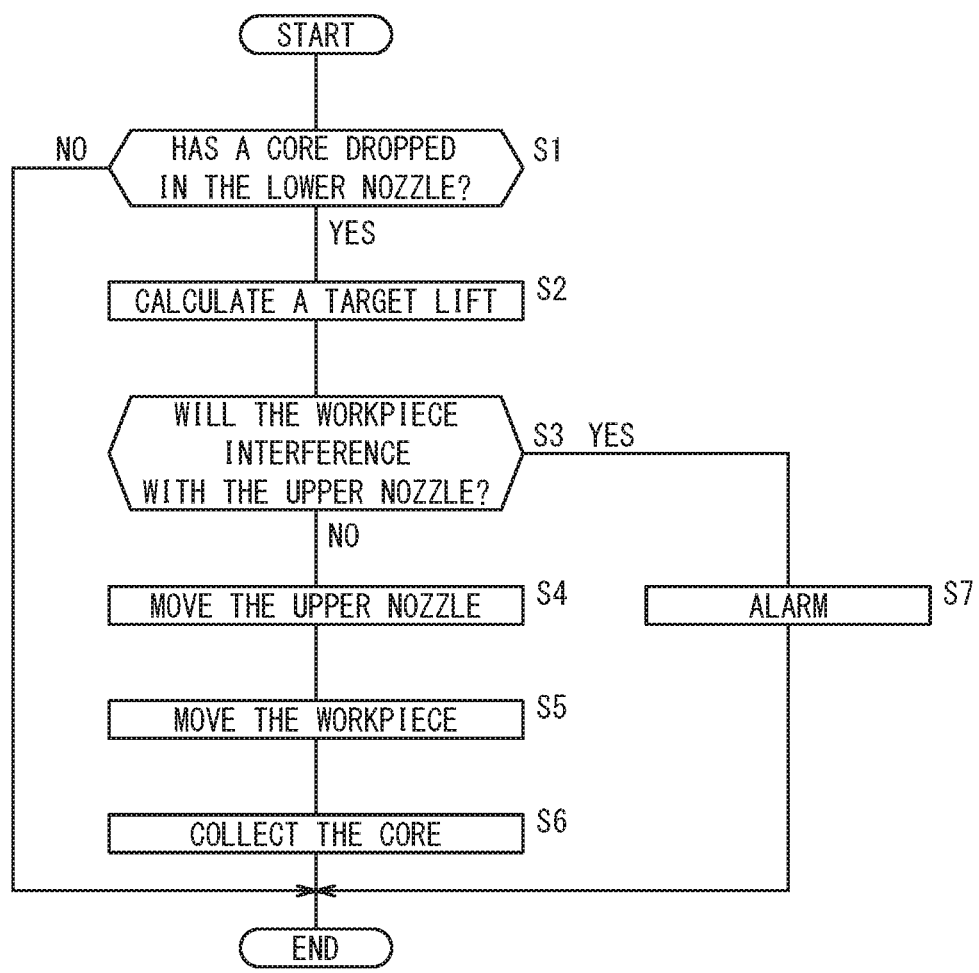
FIG. 6 is a flowchart showing a processing flow of core collecting control performed in the controller.

FIG. 6 is a flowchart showing a processing flow of the core collection control performed in the controller 16. At step S1, the core drop determiner 92, based on the information input from the drop detection sensor 44, determines whether or not the core C has fallen in the lower nozzle 38. When the core C has dropped in the lower nozzle 38, the control goes to step S2. When the core C has not fallen into the lower nozzle 38, the control is terminated.

At step S2, the target lift calculator 94 calculates the target lift of the workpiece W to be raised by the lifting mechanism 64, and the control proceeds to step S3. The target lift is a value, at least, greater than the aforementioned distance (T-D) and is calculated so that the end effector of the articulated robot 14 can operate between the workpiece W and the lower nozzle 38.

At step S3, the alarm control unit 102 determines whether or not the workpiece W interferes with the upper nozzle 36 from the thickness of the workpiece W and the target lift. When the workpiece W is moved in the positive Z-axis direction by the lifting mechanism 64, the upper nozzle 36 is also moved in the positive Z-axis direction by the Z-axis driving mechanism 40. However, when the workpiece W is thick, the workpiece W moves toward the upper nozzle 36 beyond the drive range of the Z-axis driving mechanism 40, and the workpiece W may interfere with the upper nozzle 36 in some cases. The alarm control unit 102, before the lifting mechanism 64 moves the workpiece W in the positive Z-axis direction, determines whether or not the workpiece W interferes with the upper nozzle 36 based on the thickness of the workpiece W and the target lift.

When it is determined at step S3 that the workpiece W will not interfere with the upper nozzle 36, at step S4 the Z-axis drive control unit 98 computes a command signal based on the calculated target lift and outputs the command signal to the Z-axis driving mechanism 40. Then, the control proceeds to step S5. As a result, the upper nozzle 36 moves in the positive Z-axis direction. At step S5, the lifting mechanism control unit 96 computes a command signal based on the calculated target lift, and outputs the command signal to the lifting mechanism 64, and the control goes to step S6. Thereby, the workpiece W moves in the positive Z-axis direction. At step S7, the robot control unit 100 computes a command signal for causing the articulated robot 14 to collect the core C dropped in the lower nozzle 38, and outputs the command signal to the articulated robot 14.

When it is determined at step S3 that the workpiece W interferes with the upper nozzle 36, at step S7 the alarm control unit 102 computes a command signal for causing the alarm unit 68 to alert the operator to the interference of the workpiece W with the upper nozzle 36, and outputs the command signal to the alarm unit 68, and then the control is terminated.

[Operation and Effect]

In the present embodiment, the work table 52 is provided with the lifting mechanism 64 for moving the workpiece W in the travelling direction (Z-axis direction) of the wire electrode 18. Thereby, a space can be secured between the workpiece W and the lower nozzle 38 so that the core C dropped inside the lower nozzle 38 can be easily collected.

Further, in the present embodiment, the lifting mechanism control unit 96 for controlling the lifting mechanism 64 is provided. Accordingly, the lifting mechanism 64 can be automatically driven to move the workpiece W in the Z-axis direction of the wire electrode 18.

Furthermore, in the present embodiment, when the drop detection sensor 44 detects that the core C has fallen in the lower nozzle 38, the lifting mechanism control unit 96 causes the lifting mechanism 64 to move the workpiece W toward the upper nozzle 36. As a result, when the core C drops into the lower nozzle 38, the workpiece W automatically moves toward the upper nozzle 36, so that a space can be created between the workpiece W and the lower nozzle 38, whereby it is possible to easily collect the core C which has fallen in the lower nozzle 38.

Also, in the present embodiment the core C having dropped in the lower nozzle 38 is collected by the articulated robot 14. Thus, it is possible to automatically collect the core C. Further, in the present embodiment the target lift calculator 94 calculates the target lift of the workpiece W based on the thickness of the workpiece W, and the lifting mechanism control unit 96 controls the lifting mechanism 64, based on the calculated target lift. Thereby, the workpiece W can be moved to a position where the core C completely comes out of the hole of the workpiece W, and the core C can be reliably collected.

Further, in the present embodiment, when the alarm control unit 102 determines that the workpiece W will interfere with the upper nozzle 36, the alarm unit 68 alerts the operator to the interference of the workpiece W with the upper nozzle 36. As a result, the operator can recognize that the core C cannot be collected automatically, and can switch operation mode to a mode for collecting the core C manually.

Furthermore, in the present embodiment, when the workpiece W is moved in the Z-axis direction by the lifting mechanism 64, the upper nozzle 36 is also moved in the same direction as the workpiece W by the Z-axis driving mechanism 40. Thereby, it is possible to suppress interference between the workpiece W and the upper nozzle 36.

[Second Embodiment]

Figure 7A:
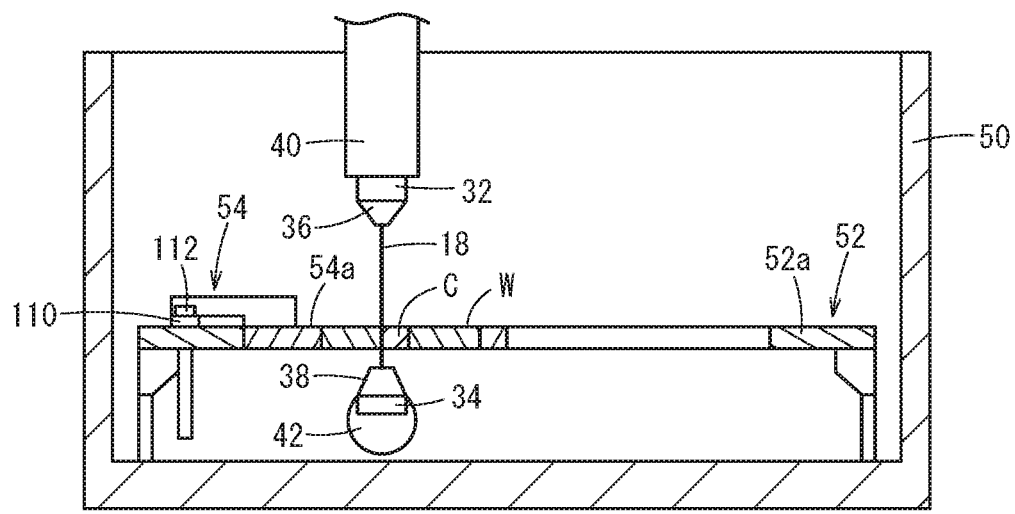
FIG. 7A is a schematic sectional view of the interior of a work-pan, showing a state in which a workpiece is being machined.
Figure 7B:
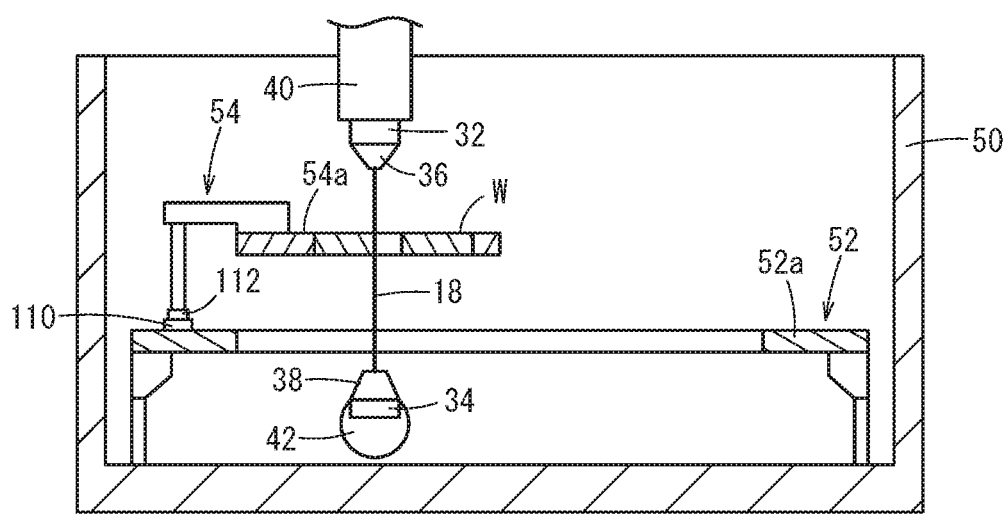
FIG. 7B is a schematic sectional view of the interior of the work-pan, showing a state in which the workpiece has been moved in the Z-axis direction by a lifting mechanism.

In the first embodiment, the lifting mechanism 64 is provided in the work table 52. In the second embodiment, however, a lifting mechanism 110 is provided with the jig 54. FIGS. 7A and 7B are schematic sectional views of the interior of a work-pan 50. FIG. 7A is a diagram showing a state in which the workpiece W is being machined. FIG. 7B is a diagram showing a state in which the workpiece W has been moved in the Z-axis direction by the lifting mechanism 110.

The lifting mechanism 110 has an unillustrated lift motor and the like, which is driven to move the retainer 54a of the jig 54 in the Z-axis direction. At this time, the workpiece W fixed by the jig 54 also moves in the Z-axis direction together with the retainer 54a. The lifting mechanism 110 has a linear scale 112 for detecting the movement of the retainer 54a.

The configuration of the controller 16 of the second embodiment is substantially the same as that of the controller 16 of the first embodiment. The specific control method of the controller 16 of the second embodiment is the same as the control method of the controller 16 of the first embodiment. In the controller 16 of the first embodiment, various pieces of information are input from the drop detection sensor 44, the linear scale 66 and the distance measuring sensor 72, to output command signals for controlling the articulated robot 14, the torque motor 24, the brake motor 28, the X-axis motor 62, the Y-axis motor 58, the Z-axis motor of the Z-axis driving mechanism 40 and the lifting mechanism 64. On the other hand, in the controller 16 of the second embodiment, various pieces of information are input from the drop detection sensor 44, the linear scale 112 and the distance measuring sensor 72, to output command signals for controlling the articulated robot 14, the feed mechanism 20 (the torque motor 24, the brake motor 28), the X-axis motor 62, the Y-axis motor 58, the Z-axis motor of the Z-axis driving mechanism 40 and the lifting mechanism 110.

[Operation and Effect]

In this embodiment, the jig 54 is provided with the lifting mechanism 110 for moving the workpiece W in the traveling direction (Z-axis direction) of the wire electrode 18. Thereby, a space can be secured between the workpiece W and the lower nozzle 38, so that the core C having dropped in the lower nozzle 38 can be easily collected.

[Third Embodiment]

Although the wire electrical discharge machine 12 of the third embodiment is the same in construction as the wire electrical discharge machine 12 of the first embodiment, the lifting mechanism 64 is driven not only to collect the core C, but also at the time of normal machining.

Figure 8A:
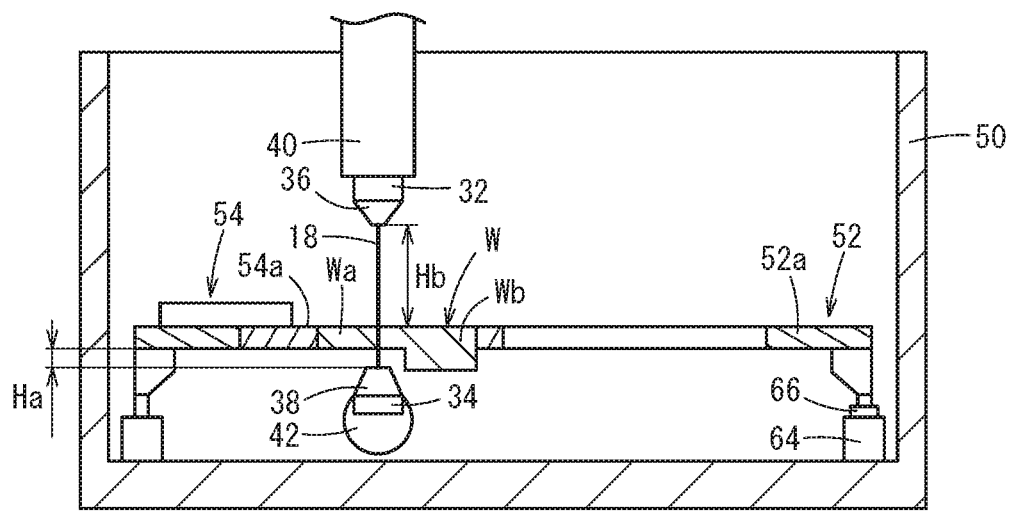
FIG. 8A is a schematic sectional view of the interior of a work-pan, showing a state in which a thin portion of a workpiece is being machined.
Figure 8B:
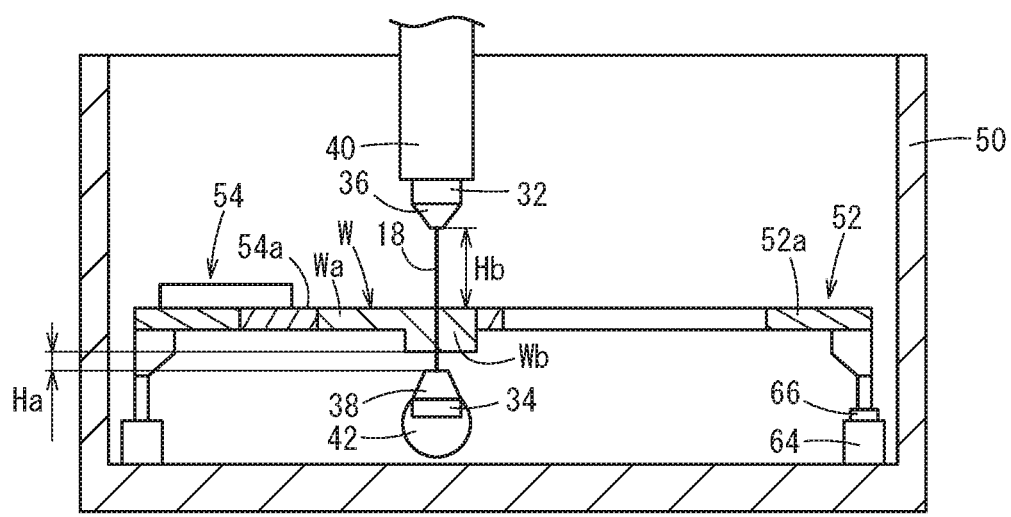
FIG. 8B is a schematic sectional view of the interior of the work-pan, showing a state in which a thick portion of the workpiece is being machined.

FIGS. 8A and 8B are schematic sectional views of the interior of the work-pan 50. FIG. 8A is a diagram showing a state in which a thin portion Wa of the workpiece W is being machined. FIG. 8B is a diagram showing a state in which a thick portion Wb of the workpiece W is being machined. The undersurface of the thick portion Wb protrudes downward or in the negative Z-axis direction compared to the undersurface of the thin portion Wa.

During the machining of the workpiece W, the lifting mechanism control unit 96 computes a command signal for adjusting the distance between the undersurface of the workpiece W and the lower nozzle 38 at a predetermined distance and outputs the command signal to the lifting mechanism 64. Further, during the machining of the workpiece W, the Z-axis drive control unit 98 computes a command signal for adjusting the distance between the upper surface of the workpiece W and the upper nozzle 36 at a predetermined distance and outputs the command signal to the Z-axis motor of the Z-axis driving mechanism 40.

That is, the lifting mechanism control unit 96 computes the command signal so that the undersurface of the workpiece W will be spaced the predetermined distance from the lower nozzle 38 at the machining position of the workpiece W moving according to the NC program. Further, the Z-axis drive control unit 98 computes the command signal so that the upper nozzle 36 will be spaced the predetermined distance from the upper surface of the workpiece W at the machining position of the workpiece W moving according to the NC program.

As a result, as shown in FIGS. 8A and 8B, even when the workpiece W having the thin portion Wa and the thick portion Wb is being machined, the distance between the undersurface of the workpiece W and the lower nozzle 38 can be kept at a distance Ha set in advance while the distance between the upper surface of the workpiece W and the upper nozzle 36 can be kept at a predetermined distance Hb, whereby it is possible to improve the machining accuracy of the workpiece W.

[Operation and Effect]

In the present embodiment, the lifting mechanism control unit 96 controls the lifting mechanism 64 so as to keep the undersurface of the workpiece W from the lower nozzle 38 at the predetermined distance at the machining point of the workpiece W moving according to the NC program. As a result, the distance between the undersurface of the workpiece W and the lower nozzle 38 can always be maintained at a predetermined distance during the machining of the workpiece W, whereby it is possible to improve the machining accuracy of the workpiece W.

[Other Embodiments]

Although the present invention has been described with reference to the embodiments, the technical scope of the present invention should not be limited to the scope described in the above embodiments. It goes without saying that various modifications and/or improvements can be added to the above embodiments. It is obvious from the description of the scope of the claims that modes with such modifications and/or improvements can be included in the technical scope of the present invention.

In each of the above embodiments, the drop detection sensor 44 detects a fall of the core C into the lower nozzle 38 from the decrease or fluctuation of the current between the wire electrode 18 and the workpiece W. The drop detection sensor 44 may be configured to detect a fall of the core C into the lower nozzle 38 based on the torque of the X-axis motor 62 and the torque of the Y-axis motor 58. As shown in FIG. 5, when the dropped core C is located straddling between the workpiece W and the lower nozzle 38, greater torque than usual acts on the X-axis motor 62 and the Y-axis motor 58. That is, the drop detection sensor 44 can detect a fall of the core C into the lower nozzle 38 from the fact that the torque of the X-axis motor 62 and the torque of the Y-axis motor 58 become greater than the predetermined torque.

In each of the above embodiments, the lifting mechanism 64 or 110 moves the workpiece W upward to the upper nozzle 36 when the core C falls into the lower nozzle 38. However, the lifting mechanisms 64, 110 may be configured to move the workpiece W upward to the upper nozzle 36 when the core C just interferes with the edge of the lower nozzle 38, instead of falling into the lower nozzle 38.

In the third embodiment, the lifting mechanism 64 of the work table 52 of the first embodiment is used to adjust the distance between the undersurface of the workpiece W and the lower nozzle 38 to the predetermined distance during the machining of the workpiece W. However, the lifting mechanism 110 of the jig 54 of the second embodiment may be used to keep the distance between the undersurface of the workpiece W and the lower nozzle 38 at the predetermined distance during the machining of the workpiece W.

[Technical Idea Obtained from the Embodiments]

Technical ideas that can be grasped from the above embodiments will be described below.

A wire electrical discharge machine (12) for performing electrical discharge machining on a workpiece (W) by applying voltage across an electrode gap between a wire electrode (18) stretched between an upper nozzle (36) and a lower nozzle (38) and the workpiece (W) to generate electrical discharges, includes a lifting mechanism (64, 110) configured to move the workpiece (W) in the travelling direction of the wire electrode (18). Thereby, a space can be secured between the workpiece (W) and the lower nozzle (38) so that the core (C) having dropped in the lower nozzle (38) can be easily collected.

The above wire electrical discharge machine (12) may further include a work table (52) on which the workpiece (W) is set, and the lifting mechanism (64) may be provided with the work table (52) and configured to move the work table (52) in the travelling direction of the wire electrode (18). Thereby, a space can be secured between the workpiece (W) and the lower nozzle (38) so that the core (C) having dropped in the lower nozzle (38) can be easily collected. The above wire electrical discharge machine (12) may further include: a work table (52) on which the workpiece (W) is set; and a jig (54) for fixing the workpiece (W) to the work table (52). The lifting mechanism (110) may be provided with the jig (54) and configured to move the jig (54) in the traveling direction of the wire electrode (18). Thereby, a space can be secured between the workpiece (W) and the lower nozzle (38) so that the core (C) having dropped in the lower nozzle (38) can be easily collected.

The above wire electrical discharge machine (12) may further include a lifting mechanism control unit (96) configured to control the lifting mechanism (64, 110). As a result, the lifting mechanism (64, 110) can be automatically driven to move the workpiece (W) in the Z-axis direction of the wire electrode (18).

The above wire electrical discharge machine (12) may further include a drop information acquisition unit (44) configured to acquire information indicating that a core (C) formed in machining the workpiece (W) has fallen into the lower nozzle (38). The lifting mechanism control unit (96) may be configured to control the lifting mechanism (64, 110) so as to move the workpiece (W) toward the upper nozzle (36) in a case where the information that the core (C) has fallen into the lower nozzle (38) is acquired by the drop information acquisition unit (44). As a result, when the core (C) falls in the lower nozzle (38), the workpiece (W) automatically moves toward the upper nozzle (36), whereby a space can be secured between the workpiece (W) and the lower nozzle (38) so that the core (C) having dropped in the lower nozzle (38) can be easily collected.

The above wire electrical discharge machine (12) may further include: a plate thickness acquiring unit (72) configured to acquire information correlated with the plate thickness of the workpiece (W); and a target movement calculator (94) configured to calculate an amount of movement for moving the workpiece (W) toward the upper nozzle (36) by the lifting mechanism (64, 110) from the information correlated with the plate thickness of the workpiece (W). The lifting mechanism control unit (96) may be configured to control the lifting mechanism (64, 110) so as to move the workpiece (W) toward the upper nozzle (36), based on the calculated target movement. Thereby, the workpiece (W) can be moved to a position where the core (C) is completely taken out from the hole of the workpiece (W), so that the core (C) can be reliably collected.

The above wire electrical discharge machine (12) may further include an alarm controller (102) configured to determine whether or not the workpiece (W) will interfere with the upper nozzle (36), based on the calculated target movement and control an alarm unit (68) so as to alert the operator to the interference of the workpiece (W) with the upper nozzle (36) when the workpiece (W) will interfere with the upper nozzle (36). As a result, the operator can recognize that the core (C) cannot be collected automatically, and can switch operation mode to a mode for collecting the core (C) manually.

The above wire electrical discharge machine (12) may further includes: an upper nozzle driving mechanism (40) configured to move the upper nozzle (36) in the travelling direction of the wire electrode (18); and an upper nozzle drive control unit (98) configured to control the upper nozzle driving mechanism (40) so as to move the upper nozzle (36) in the same direction as the direction of movement of the workpiece (W) when the workpiece (W) is moved toward the upper nozzle (36) by the lifting mechanism (64, 110). This configuration makes it possible to suppress interference between the workpiece (W) and the upper nozzle (36).

In the above wire electrical discharge machine (12), the lifting mechanism control unit (96) may be configured to control the lifting mechanism (64, 110) so as to keep the distance between the lower nozzle (38) and the workpiece (W) at a predetermined distance set in advance. Thereby, it is possible to keep the distance between the undersurface of the workpiece (W) and the lower nozzle (38) at a predetermined distance, and improve the machining accuracy of the workpiece (W).

The above wire electrical discharge machine (12) may further include: a work table (52) on which the workpiece (W) is set; a work table driving mechanism (58, 62) configured to relatively move the work table (52) and the wire electrode (18); and a work table drive control unit (86) configured to control the work table driving mechanism (58, 62) in conformity with a machining shape of the workpiece (W) specified by a preset NC program. This configuration makes it possible to keep the distance between the undersurface of the workpiece (W) and the lower nozzle (38) at a predetermined distance at all times during the machining of the workpiece (W), thereby improving the machining accuracy of the workpiece (W).

A wire electrical discharge machining system (10) may include: a wire electrical discharge machine as described above; a core collecting mechanism (14) configured to collect the core (C) having dropped in the lower nozzle (38); and a core collecting mechanism control unit (102 control unit (100) configured to control the core collecting mechanism (14) so as to collect the core (C) after raising the workpiece (W) by means of the lifting mechanism (64, 110). Thus, it is possible to automatically collect the core (C).

A jig (54) for fixing a workpiece (W) to a work table (52) of a wire electrical discharge machine (12) includes a lifting mechanism (110) configured to move the workpiece (W) in the traveling direction of a wire electrode (18). Thereby, a space can be secured between the workpiece (W) and the lower nozzle (38) so that the core (C) having dropped in the lower nozzle (38) can be easily collected.

What is claimed is:

1. A wire electrical discharge machine for performing electrical discharge machining on a workpiece by applying voltage across an electrode gap between a wire electrode stretched between an upper nozzle and a lower nozzle and the workpiece to generate electrical discharges, comprising:
    a lifting mechanism configured to move the workpiece in a travelling direction of the wire electrode;
    a lifting mechanism control unit configured to control the lifting mechanism; and
    a drop information acquisition unit configured to acquire information indicating that a core formed in machining the workpiece has fallen into the lower nozzle,
    wherein the lifting mechanism control unit is configured to control the lifting mechanism so as to move the workpiece toward the upper nozzle in a case where the information that the core has fallen in the lower nozzle is acquired by the drop information acquisition unit.

2. The wire electrical discharge machine according to claim 1, further comprising a work table on which the workpiece is set, wherein the lifting mechanism is operatively coupled to the work table and configured to move the work table in the travelling direction of the wire electrode.

3. The wire electrical discharge machine according to claim 1, further comprising:
    a work table on which the workpiece is set; and
    a jig for fixing the workpiece to the work table, wherein the lifting mechanism is operatively coupled to the jig and configured to move the jig in the traveling direction of the wire electrode.

4. The wire electrical discharge machine according to claim 1, further comprising:
    a plate thickness acquiring unit configured to acquire information correlated with the plate thickness of the workpiece; and
    a target movement calculator configured to calculate a targeted amount of movement for moving the workpiece toward the upper nozzle by the lifting mechanism from the information correlated with the plate thickness of the workpiece, wherein the lifting mechanism control unit is configured to control the lifting mechanism so as to move the workpiece toward the upper nozzle, based on the calculated target amount of movement.

5. The wire electrical discharge machine according to claim 4, further comprising an alarm controller configured to determine whether or not the workpiece will interfere with the upper nozzle, based on the calculated target movement and control an alarm unit so as to alert the operator to the interference of the workpiece with the upper nozzle when the workpiece will interfere with the upper nozzle.

6. The wire electrical discharge machine according to claim 1, further comprising:
    an upper nozzle driving mechanism configured to move the upper nozzle in the travelling direction of the wire electrode; and
    an upper nozzle drive control unit configured to control the upper nozzle driving mechanism so as to move the upper nozzle in the same direction as the direction of movement of the workpiece when the workpiece is moved toward the upper nozzle by the lifting mechanism.

7. The wire electrical discharge machine according to claim 1, wherein the lifting mechanism control unit is configured to control the lifting mechanism so as to keep the distance between the lower nozzle and the workpiece at a predetermined distance set in advance.

8. The wire electrical discharge machine according to claim 7, further comprising:
    a work table on which the workpiece is set;
    a work table driving mechanism configured to relatively move the work table and the wire electrode; and
    a work table drive control unit configured to control the work table driving mechanism in conformity with a machining shape of the workpiece specified by a preset numerical control program.

9. A wire electrical discharge machining system comprising:
    a wire electrical discharge machine according to claim 1;
    a core collecting mechanism configured to collect a core having dropped in the lower nozzle; and
    a core collecting mechanism control unit configured to control the core collecting mechanism so as to collect the core after raising a workpiece by means of the lifting mechanism.

* * * * *